(12) United States Patent
Grossmann

(10) Patent No.: US 7,578,036 B2
(45) Date of Patent: *Aug. 25, 2009

(54) MACHINE TOOL

(75) Inventor: Walter Grossmann, Baltmannsweiler (DE)

(73) Assignee: Index-Werke GmbH Co. KG Hahn & Tessky (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/964,143

(22) Filed: Dec. 26, 2007

(65) Prior Publication Data

US 2008/0098583 A1 May 1, 2008

Related U.S. Application Data

(63) Continuation of application No. 11/508,573, filed on Aug. 23, 2006, now Pat. No. 7,334,304.

(30) Foreign Application Priority Data

Sep. 1, 2005 (DE) ........................ 10 2005 041 496

(51) Int. Cl.
*B23P 23/00* (2006.01)

(52) U.S. Cl. ........................ 29/27 C; 29/36; 409/235; 74/490.09; 82/120

(58) Field of Classification Search .............. 29/27 C, 29/27 R, 36; 409/201, 216, 235; 408/236, 408/237; 74/490.07, 490.09, 490.1, 479.01, 74/490.01; 414/669, 917; 82/149, 165, 124, 82/120–121
See application file for complete search history.

(56) References Cited

U.S. PATENT DOCUMENTS 6,099,217 A 8/2000 Wiegand et al.
(Continued)

FOREIGN PATENT DOCUMENTS

DE 100 19 788 A1 10/2001
(Continued)

OTHER PUBLICATIONS

Machine translation of WO 99/32256, 7 pages.*
(Continued)

*Primary Examiner*—Erica E Cadugan
(74) *Attorney, Agent, or Firm*—Reinhart Boerner Van Deuren P.C.

(57) ABSTRACT

In order to improve a machine tool for machining a workpiece by a relative movement between the workpiece and a tool, comprising a first receiving device for the workpiece or the tool, a compound slide system with a second receiving device for the tool or the workpiece and comprising a drive device for moving the second receiving device in relation to the first receiving device, which drive device acts at least two spaced-apart points of application by at least three drive struts extending parallel to at least two different directions and each with a pivot joint, and with which drive device the at least two points of application can be positioned by means of the at least three drive struts, in such a way that exact positioning of the second slide element can be achieved by structural measures, it is proposed that four drive struts of invariant length, each with a pivot joint, act on the slide element, each of which struts is pivotally connected to a guiding slide, which is guided in a linearly movable manner transversely in relation to the longitudinal direction of the respective drive struts, and a maximum of two of which drive struts run parallel to one another.

25 Claims, 5 Drawing Sheets

U.S. PATENT DOCUMENTS

| | | |
|---|---|---|
| 6,655,246 B2 | 12/2003 | Grossmann |
| 7,334,304 B2 * | 2/2008 | Grossmann ................. 29/27 C |
| 2003/0186631 A1 | 10/2003 | Yoshimi et al. |
| 2004/0052628 A1 * | 3/2004 | Thurneysen et al. ........ 414/699 |
| 2004/0082284 A1 | 4/2004 | Lutz et al. |
| 2005/0064800 A1 | 3/2005 | Yoshimi et al. |

FOREIGN PATENT DOCUMENTS

| | | |
|---|---|---|
| EP | 1228838 | 8/2002 |
| EP | 1 329 281 A2 | 7/2003 |
| JP | 2001179560 A | 7/2001 |
| WO | WO 97/22436 A1 | 6/1997 |
| WO | WO 99/08832 A1 | 2/1999 |
| WO | WO 99/32256 A1 | 7/1999 |
| WO | WO 02/102543 | 12/2002 |

OTHER PUBLICATIONS

U.S. Appl. No. 11/508,573, filed Aug. 23, 2006, Grossmann.

* cited by examiner

MACHINE TOOL

CROSS-REFERENCE TO RELATED PATENT APPLICATIONS

This patent application is a continuation of U.S. patent application Ser. No. 11/508,573, now U.S. Pat. No.7,334,304 filed Aug. 23, 2006, and claims the benefit of German Application No. 10 2005 041 496.6, filed Sep. 1, 2005, the teachings and disclosure of which are hereby incorporated in its entirety by reference thereto.

BACKGROUND OF THE INVENTION

The invention relates to a machine tool for machining a workpiece by a relative movement between the workpiece and a tool, comprising a machine frame, a carrier disposed on the machine frame and having a first receiving means for the workpiece or tool, a compound slide system disposed on the machine frame and having a slide element which carries a second receiving means for the tool or the workpiece and can be moved by the compound slide system in relation to the first receiving means in a fixed movement zone of a compound slide movement area in the direction of two compound slide movement axes running transversely in relation to one another and comprising a drive device for moving the slide element that is movable in relation to the first receiving means, which drive device acts on the slide element at least two spaced-apart points of application by at least three drive struts extending parallel to at least two different directions and each with a pivot joint, and with which drive device the at least two points of application can be positioned by means of the at least three drive struts.

Machine tools of this type are already known from the prior art, for example from DE 100 19 788 A1.

In the case of a machine tool of this type, it has been found that the required precision in the positioning of the second slide element requires complex measuring systems.

It is therefore an object of the invention to achieve exact positioning of the second slide element by structural measures.

SUMMARY OF THE INVENTION

This object is achieved according to the invention in the case of a machine tool of the type described at the beginning by four drive struts of invariant length, each with a pivot joint, acting on the slide element, each of which struts is pivotally connected to a guiding slide, which is guided in a linearly movable manner transversely in relation to the longitudinal direction of the respective drive struts, and a maximum of two of which struts run parallel to one another.

The advantage of the solution according to the invention is to be seen in the fact that the precision of the positioning of the second slide element is distinctly improved by the four drive struts, in particular by an improvement of the torsional stiffness about axes of rotation running perpendicularly in relation to the compound slide movement area, in particular about a so-called B axis.

The second slide element can be positioned particularly advantageously if the four drive struts form two drive groups, each with two non-parallel drive struts, so that the two drive groups can uniquely fix the position of the movable slide element.

A particularly suitable solution provides here that a position of the slide element can be fixed with the first drive group apart from a first still possible form of movement.

A further advantageous solution provides that a position of the slide element can be fixed with the second drive group apart from a second still possible form of movement.

Since, however, the first drive group and the second drive group do not act at identical points of the movable slide element, a unique positioning of the movable slide element is thereby obtained, since the first still possible form of movement as a result of the first drive group is blocked by the second drive group and the second still possible form of movement due to the second drive group is blocked by the first drive group.

In principle, the drive struts of each drive group act on the movable slide element with a point of application of their own, so that four drive struts may be provided altogether, each acting on the slide element with their own points of application.

To improve the stability of the positioning, however, it has proven to be advantageous if the drive struts of one of the drive groups act on the movable slide element at a common point of application.

In this case, the respective still possible form of movement of the slide element represents a pivoting movement about the common point of application.

However, it is even more advantageous for the precision of the positioning of the slide element if the drive struts of each of the drive groups respectively act on the slide element at one of two spaced-apart points of application.

In this case, consequently, only two points of application are provided on the slide element, each of which is uniquely and stably defined by the respective drive group apart from the still free possible form of movement in the form of a pivoting movement.

With regard to the path followed by the guiding directions of the guiding slides, nothing has been stated in connection with the description so far of the solution according to the invention. For example, it is conceivable for two guiding slides to be movably disposed in each case, parallel to the same guiding direction. This could be, for example, the guiding slides respectively of one drive group, in which case the guiding directions of the two drive groups could still differ from one another.

However, in order to minimize the space required for the drive device, it is advantageous if in each case two of the guiding slides are guided on a common guideway.

In this case, there is the possibility of for example allowing the guiding slides of each drive group to run on a common guideway.

A further advantageous solution provides that the guiding slides of the drive struts are guided in guiding directions running parallel to one another.

There is consequently the possibility in principle of guiding each of the guiding slides along a guiding direction of its own, which directions however all run parallel to one another.

It is particularly advantageous, however, if a first guiding slide of the first drive group and a first guiding slide of the second drive group are movable along the same guiding direction.

Such a solution is still more space-saving if the first guiding slides of the first and second drive groups are guided on a common guideway.

Furthermore, an advantageous exemplary embodiment provides that a second guiding slide of the first drive group and a second guiding slide of the second drive group are movable along the same guiding direction.

Furthermore, it is advantageous if a second guiding slide of the first drive group and a second guiding slide of the second drive group are guided on a common guideway.

In order to simplify the drive of the guiding slides, a particularly advantageous solution provides that the first guiding slides of the first and second drive groups are rigidly coupled to one another, that is to say that the first guiding slides of the first and second drive groups are only movable together with one another.

A rigid coupling of the first guiding slides to one another in this way may take place for example by a rigid coupling of the drives of the first two guiding slides taking place via the control.

The rigid coupling can be realized particularly easily if the first guiding slides of the first and second drive groups are rigidly coupled to one another mechanically.

As an alternative to this, however, it is also conceivable to combine the first guiding slides of the first and second drive groups to form a common guiding slide.

Furthermore, it is provided in a similar way that the second guiding slides of the first and second drive groups are rigidly coupled to one another, so that they can also be driven in a simple manner.

In this case it would likewise be conceivable to provide a rigid coupling of the second guiding slides via a control for the drives of the two second guiding slides, it being easier for the rigid coupling to be realized if the second guiding slides of the first and second drive groups are rigidly coupled to one another mechanically.

A solution that is spatially particularly advantageous and of a small construction provides that all the guiding slides are disposed on a common guideway.

When all the guiding slides are provided on a common guideway, the guiding slides are preferably disposed one following the other on it.

It is particularly advantageous in this case if the guiding slides of each drive group are disposed one directly following the other, this directly successive sequence in which the guiding slides are disposed providing within the scope of the solution according to the invention a controllable variable spacing between the guiding slides in addition to the controllable variable position along the guiding direction.

A mechanical coupling of the first guiding slides of the drive groups and the second guiding slides of the drive groups can be realized particularly advantageously when all the guiding slides are provided on a common guideway, if the mechanically rigid connection between the first guiding slides runs on a different side of the guideway than the mechanically rigid connection between the second guiding slides.

The kinematics of the drive device according to the invention can be realized particularly easily if two of the drive struts respectively run parallel to one another.

It is preferably provided in this case that the drive struts articulated on the first guiding slides of the drive groups run parallel to one another and the drive struts articulated on the second guiding slides of the drive groups run parallel to one another.

Furthermore, the kinematics according to the invention can be controlled particularly easily if two of the four drive struts respectively are of the same length.

The drive struts are preferably designed in such a way that all four drive struts are of the same length.

With regard to the drive of the guiding slides, it would be conceivable in principle to drive each of the guiding slides separately.

In particular in the case where the first guiding slides of the drive groups and the second guiding slides of the drive groups, respectively, are rigidly coupled to one another, it is adequate if a linear drive is associated with the respectively mechanically coupled guiding slides.

The linear drive could be, for example, a linear motor. However, it is mechanically simpler if the linear drive is a spindle drive.

With regard to the disposition of the guideways for the guiding slides, so far nothing more specific has been stated. So a structurally particularly advantageous solution provides that all the guideways for all the guiding slides are disposed on the same side of the points of application, in order to make the drive device according to the invention as compact as possible.

In order to allow the relative position, and consequently in particular the position in the X direction, to be easily detected, a measuring system which directly detects a relative position of the first guiding slides in relation to the second guiding slides is provided.

Position detection of this kind can be realized particularly advantageously if the measuring system is disposed on connecting struts of the first guiding slides and of the second guiding slides.

As an alternative or in addition to the solution described so far, a further solution provides that drive struts of invariant length act on the slide element, each of which struts is pivotally connected to a guiding slide, which is guided in a linearly movable manner transversely in relation to the longitudinal direction of the drive struts, and that guideways for at least two of the guiding slides are disposed on a side of the points of application facing the spindle axis.

The advantage of this solution can be seen in that the drive struts consequently extend from a region of the machine tool which undergoes minor thermal displacements with respect to the spindle axis, and consequently also the position of the movable slide elements that is predetermined by the drive device undergoes only minor thermal displacements.

Furthermore, it is advantageous in the case of this solution that, on account of their invariance of length, no heat directly enters the drive struts as a result of a length adjustment of the same, so that the thermal displacement in the region of the drive struts can also be kept low.

In the case of this solution, it is particularly advantageous if the guideways for the guiding slides are disposed near a reference plane which runs through the spindle axis and perpendicularly in relation to the X direction of the machine tool.

This solution has the great advantage that the base for the drive struts of the drive device consequently already lies near the spindle axis, and consequently substantially only thermal displacements in the region of the drive struts have any effect on the position of the movable slide element, while all other thermal displacements, in particular in the machine bed body, have substantially no effect on the position of the movable slide element in relation to the spindle axis.

It is particularly advantageous if the guideways for all the guiding slides are disposed on the side of the points of application facing the spindle axis, so that all the drive struts have an effect on the positioning accuracy in the same direction in the event of a thermally induced change in their length.

Otherwise, further advantageous embodiments have the same features as described above.

Further features and advantages of the invention are the subject of the description which follows and of the graphic representation of an exemplary embodiment of a solution according to the invention.

DETAILED DESCRIPTION OF THE INVENTION

Figure 1:
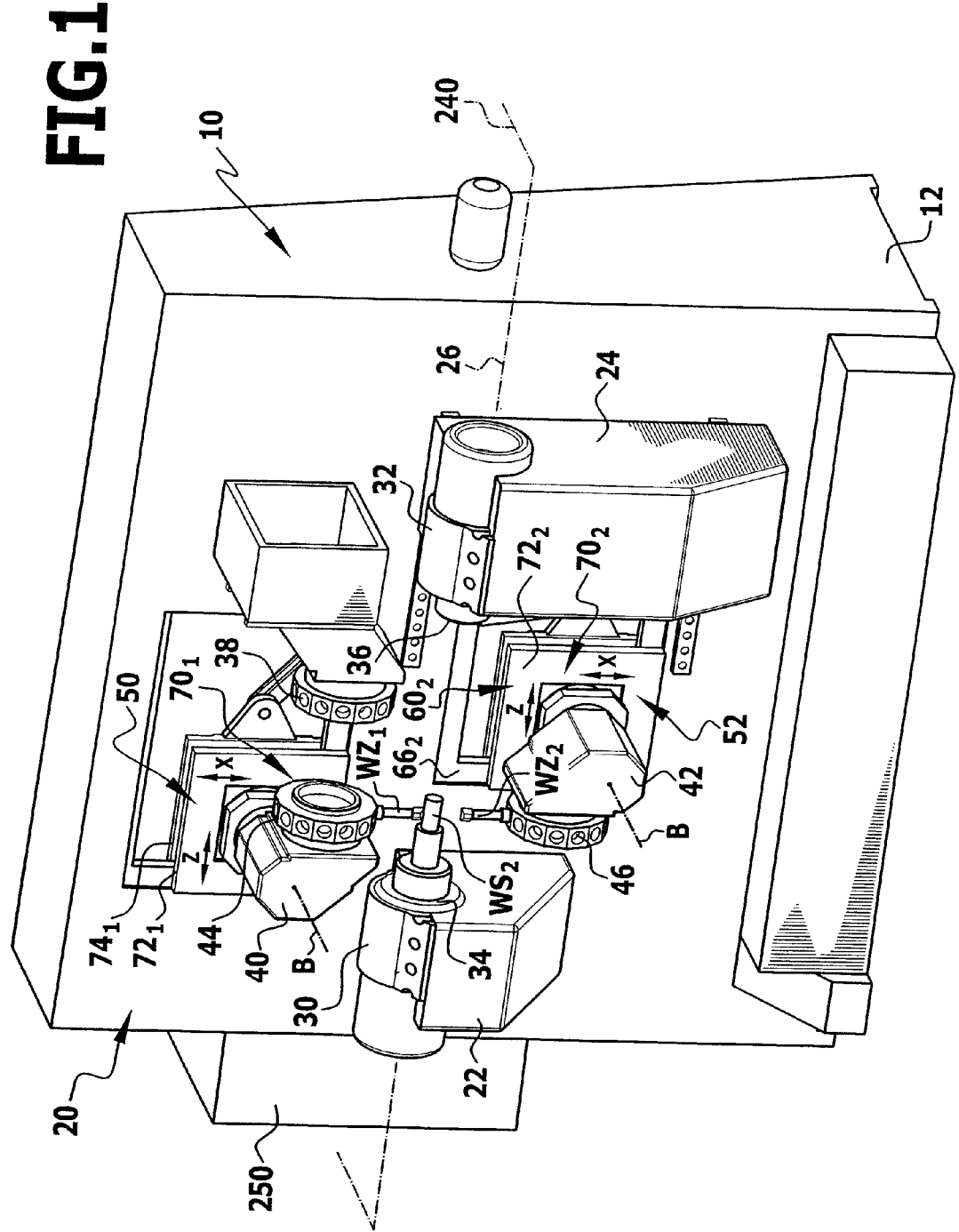
FIG. 1 shows a perspective schematic representation of an exemplary embodiment of a machine tool looking toward a front side, but without showing a slide element on the machine bed side for an upper movable slide element.

An exemplary embodiment of a machine tool according to the invention, represented in FIG. 1, comprises a machine frame, which is designated as a whole by 10, can be placed with a foot 12 on a base area and comprises a machine bed body, which is designated as a whole by 20 and is preferably formed in a way similar to a plate.

On this machine bed body 20 there are, for example, two headstocks 22, 24, in which workpiece spindles 30, 32 are disposed coaxially in relation to a spindle axis 26, lie opposite each other and are provided with workpiece receiving means 34, 36 for workpieces WS, which represent first receiving means and are disposed facing one another.

In this case, the machine tool represents a lathe.

However, instead of workpiece spindles 30, 32, it would also be conceivable to provide tool spindles with tool receiving means.

In the case of this exemplary embodiment of the machine tool according to the invention, the headstock 22 is disposed on the machine bed body 20 in a stationary manner, while the headstock 24 can for example be made to move in the direction of the spindle axis 26.

However, it would also be conceivable to arrange for both headstocks 22, 24 to be movable in relation to the machine bed body 20.

For machining the workpieces WS disposed in the workpiece receiving means 34, 36, a tool carrier 38, which can only be made to move transversely in relation to the spindle axis 26 and is associated with the workpiece spindle 32, and also tool carriers 40, 42, which are associated with the workpiece spindles 30, 32, are provided, each of which comprises a multiplicity of tool receiving means 44, 46 for tools WZ, representing second receiving means.

In order to allow the tool carriers 40, 42, and consequently the tool receiving means 44, 46, to be moved in relation to the workpiece receiving means 34, 36, the tool carriers 40, 42 are disposed on for example identically constructed compound slide systems 50, 52, each of which comprises a first slide element 60 on the machine bed side, which is formed for example as a plate 62 with an aperture 64 in a central region of the same and has around the aperture 64 surfaces 66, 68 running substantially parallel to one another, the surfaces 66 being front surfaces and the surfaces 68 being rear surfaces of the plate 62.

As an alternative to this, instead of the plate 62, it is also conceivable to provide on both sides of the aperture 64 guiding strips, which lie with their two surfaces 66, 68 respectively in the same plane.

On this first slide element 60 on the machine bed side, a second slide element 70 on the tool carrier side is movably guided, to be precise by the latter sliding with guiding bodies 72, 74 on the surfaces 66, 68.

Consequently, the surfaces 66, 68 of the first slide element 60 running parallel to one another define a compound slide movement area, parallel to which the respective second slide element 70 is movable in relation to the machine bed body 20, both in the X direction, that is to say transversely in relation to the spindle axis 26, and in the Z direction, that is to say parallel to the spindle axis 26.

Further details and embodiments of compound slide systems 50, 52 of this type, in which the respective second slide element 70 is movable in the direction of both compound slide movement axes X, Z, are described in German Patent Application DE 100 19 788 A1, to which reference is made with regard to the embodiments of the various compound slide systems.

The tool carriers 40, 42 are preferably also in each case rotatable with respect to the corresponding second slide element 70 about a B axis, which is perpendicular to the X/Z plane.

Figure 2:
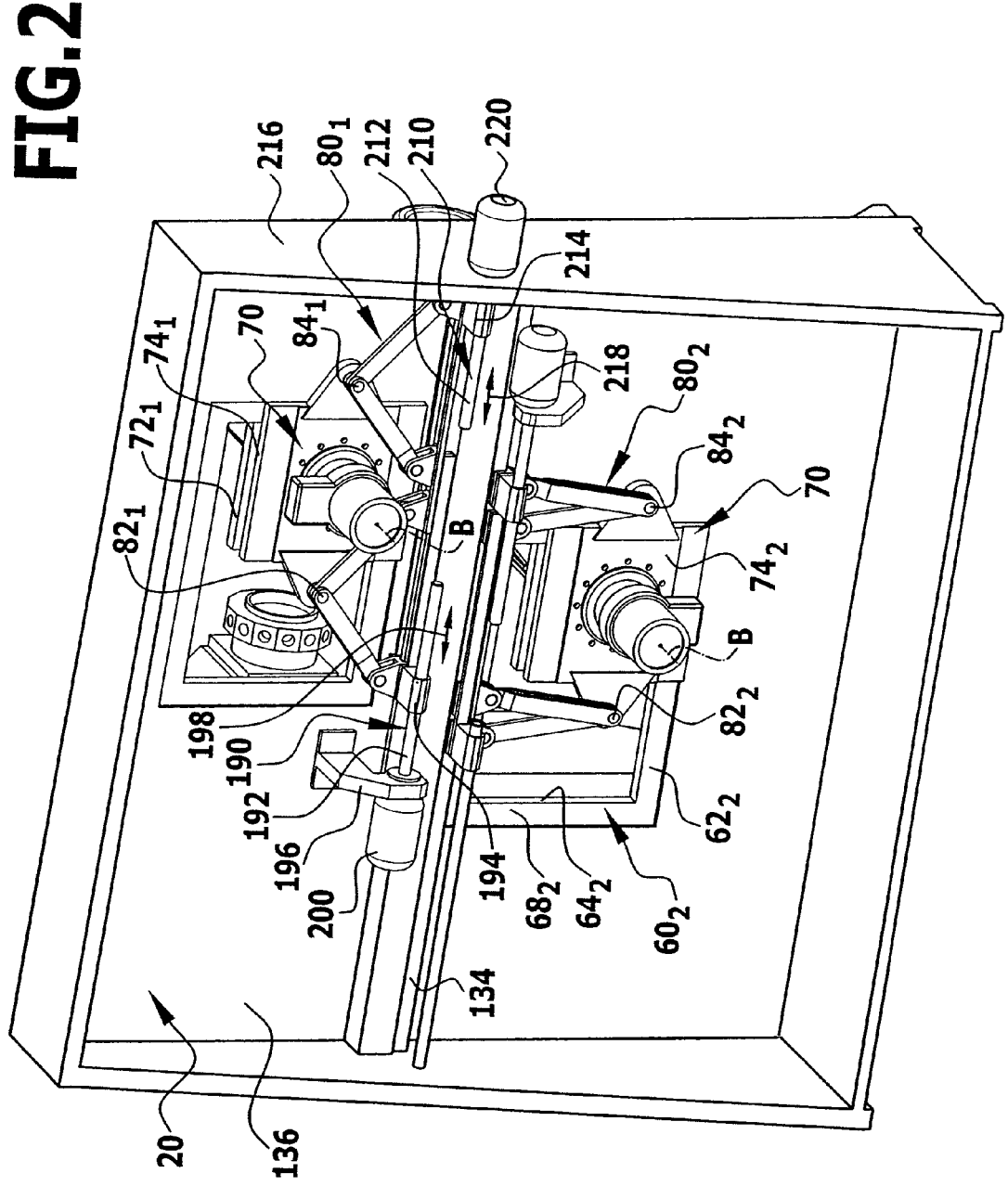
FIG. 2 shows a perspective representation of the machine tool looking at the rear side.

For moving the respective second slide element 70 in relation to the respective first slide element 60, as represented in FIG. 2, associated with each compound slide system 50, 52 is a drive device 80, which acts on the respective slide element 70 at two spaced-apart points of application 82, 84, in order to position the respective second slide element 70 in relation to the first slide element 60 in the X and Z directions in the respective compound slide movement plane.

Figure 3:
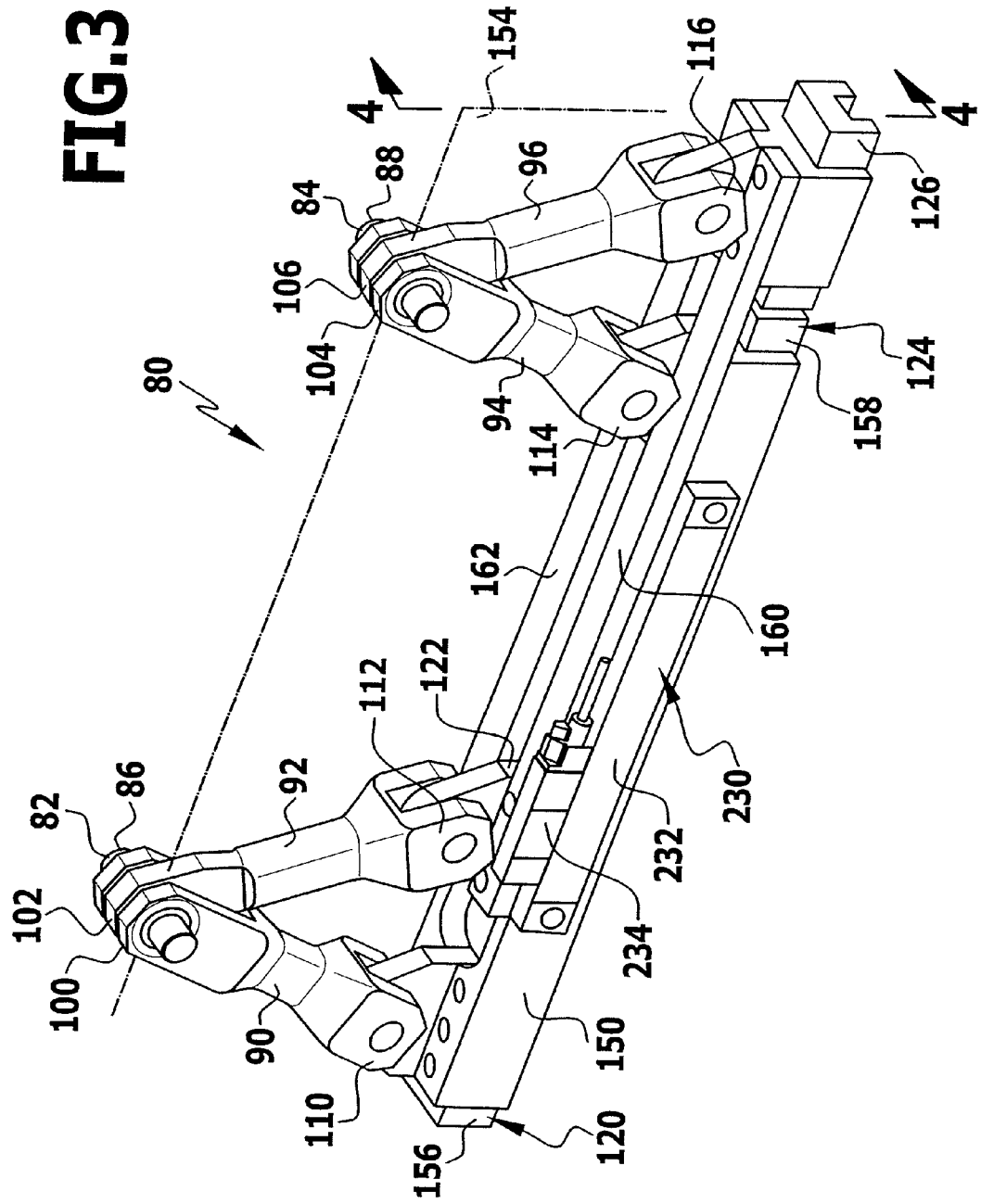
FIG. 3 shows a perspective representation of the drive device as used in the exemplary embodiment represented of the machine tool.
Figure 4:
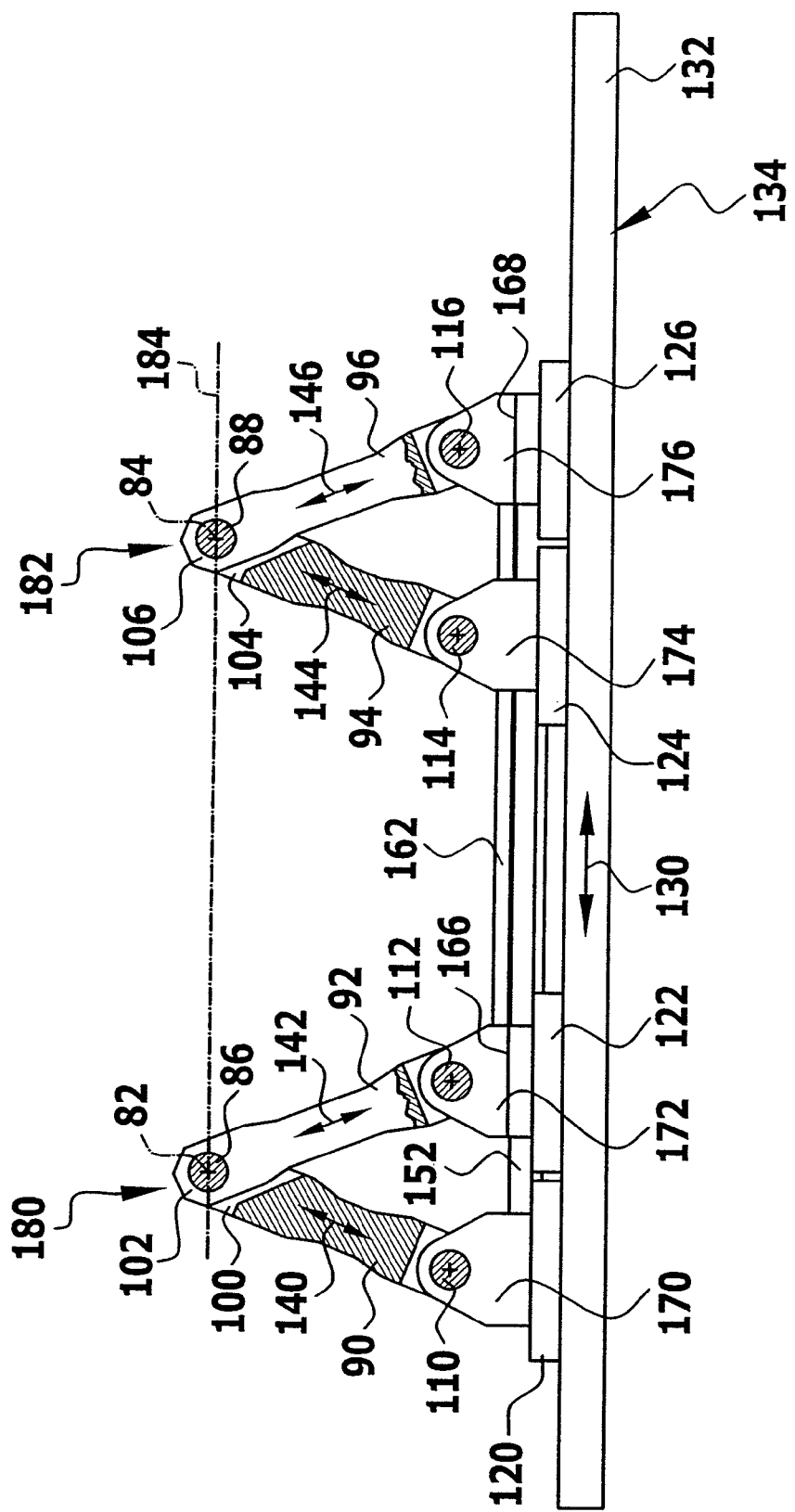
FIG. 4 shows a section along line 4-4 in FIG. 3.
Figure 5:
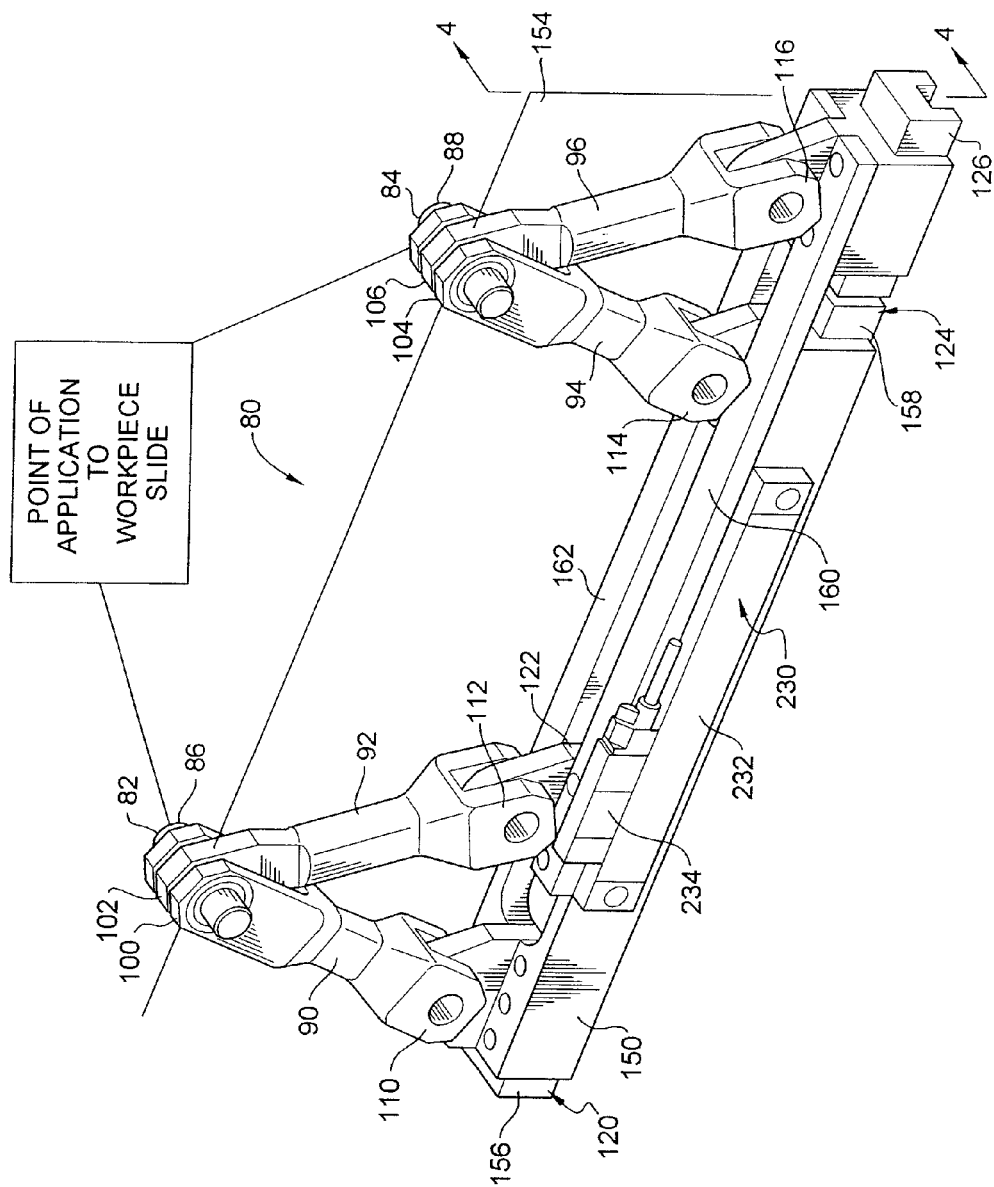
FIG. 5 shows a view similar to that of FIG. 3, but with the points of application 82, 84 schematically shown affixed to a slide element including receiving means for receiving a workpiece instead of a tool, in an embodiment wherein this slide element moves the workpiece relative to receiving means for receiving a tool.

As shown enlarged in FIGS. 3 and 4, the drive device 80 comprises altogether four drive struts 90, 92, 94, 96, the drive struts 90 and 92 acting by means of pivot joints 100, 102 at the point of application 82, formed by a bearing pin 86, and the drive struts 94 and 96 acting by means of pivot joints 104 and 106 on a bearing pin 88 defining the point of application 84.

Furthermore, each of the drive struts 90, 92, 94, 96 is pivotally connected by means of a pivot joint 110, 112, 114, 116 to in each case a guiding slide 120, 122, 124, 126, the guiding slides 120, 122, 124, 126 being guided along a guideway 132, which fixes a common guiding direction 130 and is formed for example by a guiding rail 134.

The guiding rail 134 is preferably disposed on a rear side 136 of the machine bed body 20 and is held by the machine bed body 20.

Disposed in this way, the drive struts 90, 92, 94, 96 always extend with their longitudinal directions 140, 142, 144, 146 transversely, in particular obliquely, in relation to the guiding direction 130, irrespective of the position of the guiding slides 120 to 126 along the guideway 132, and the longitudinal directions 140, 142, 144 and 146 run parallel to a central plane 154.

Furthermore, in the case of the exemplary embodiment represented, the drive struts 90, 92, 94, 96 are formed in such a way that their length between the respective pivot joints 100 and 110, 102 and 112, 104 and 114 and also 106 and 116 is of the same size.

In addition, the guiding slides 120 and 122 and also 124 and 126 are positioned in relation to one another in such a way that the longitudinal directions 140 and 144 of the drive struts 90 and 94 and also the longitudinal directions 142 and 146 of the drive struts 92 and 96 run parallel to one another.

This can be achieved in particular by the guiding slides 120 and 124 being rigidly coupled to one another by connecting struts 150 and 152, the connecting struts 150 and 152 running between the guiding slides 120 and 124, for example on both sides of the central plane 154 of the drive device 80, to be precise at such a spacing from the guiding slide 122 that the latter can move freely between the connecting struts 150 and 152 and also along the guideway 132 between the guiding slides 120 and 124.

The connecting struts 150 and 152 in this case preferably lie in such a way that they act on side faces 156 and 158 of the guiding slides 120 and 124, the side faces 156 and 158 being side faces of the guiding slides 120 and 124 that run for example approximately parallel or obliquely in relation to the central plane 154.

Furthermore, the guiding slides 122 and 126 are likewise rigidly coupled to one another by connecting struts 160 and 162, the connecting struts 162 and 164 acting on the guiding slides 122 and 126 in the region of upper sides 166 and 168 running transversely in relation to the central plane 154, and consequently running in a collision-free manner in relation to the connecting struts 150 and 152, and the connecting struts 160 and 162 being disposed with such a spacing from one another that a pivot joint flange 174 of the guiding slide 124 is freely movable between the connecting struts 160 and 162.

Otherwise, all the pivot joint flanges 170, 172, 174 and 176 supporting the pivot joints 110, 112, 114 and 116 are formed in such a way that the pivot joints 110, 112, 114 and 116 can be moved at the same spacing from the guiding rail 134 and parallel to the guiding direction 130 by moving the guiding slides 120, 122, 124 and 126.

The parallel alignment of the longitudinal directions 140 and 144 of the drive struts 90 and 94 and also of the longitudinal directions 142 and 146 of the drive struts 92 and 96 is ensured in every relative position of the guiding slides 120 and 124 with respect to the guiding slides 122 and 126 by the rigid connection of the guiding slides 120 and 124 and also 122 and 126 by means of the connecting struts 150 and 152 or 160 and 162, respectively.

Consequently, the drive struts 90 and 92, the pivot joints 110 and 112 of which are always spaced apart from one another while the pivot joints 100 and 102 of which act on the same bearing pin 86, form the sides of an isosceles triangle, which on the one hand uniquely fixes the position of the point of application 82 in the guiding direction 130, which preferably runs parallel to the Z direction of the machine tool, and on the other hand also uniquely fixes its spacing from the guideway 132, which corresponds to the X direction whenever—as provided in the case of the exemplary embodiment represented—the central plane 154 of the drive device 80 runs parallel to the compound slide movement plane, and consequently parallel to the surfaces 66 and 68 of the first slide element 60.

Consequently, the Z position of the point of application 82 on the slide element 70 can be uniquely fixed by the absolute position of the guiding slides 120 and 122 in the guiding direction 130, and the X position of the point of application 82 on the slide element 70 can be uniquely fixed by the relative position of the guiding slides 120 and 122.

The single degree of freedom of the movement of the slide element 70 when the point of application 82 is fixed in such a way consists in the slide element 70 having the possibility of turning about the point of application 82 on account of the pivot joints 100 and 102, and the bearing pins 86 that are consequently rotatable in relation to the latter.

Altogether, the drive struts 90 and 92, the longitudinal directions 140 and 142 of which run transversely in relation to one another, preferably in a V-shaped manner with respect to the point of application 82, consequently form a drive group 180, which fixes the X and Z positions of the point of application 82 of the slide element 70.

In the same way, the drive struts 94 and 96 form a drive group 182, since these drive struts 94 and 96 also form the sides of an isosceles triangle and, on the basis of the spaced-apart pivot joints 114 and 116 and the pivot joints 104 and 106, acting together on the bearing pin 88, uniquely define the point of application 84 in relation to the Z direction and in relation to the X direction of the machine tool for the same reasons as described in connection with the first drive group 180, so that the slide element 70 would only be left with the possibility of rotating about the point of application 84.

However, the position of the slide element 70 with regard to its position in the X direction and the Z direction is likewise uniquely fixed by the unique fixing of both points of application 82 and 84, and furthermore this drive device 80 only allows the slide element 70 to be displaced in positions in which the slide element 70 always maintains the same alignment in relation to the Z direction and the X direction, which is evident from the fact that a connecting line 184 between the points of application 82 and 84 always remains aligned parallel to the guiding direction 130, irrespective of the position of the guiding slides 122 and 126 in relation to the guiding slides 120 and 124, since the drive struts 90 and 94 and also 92 and 96 also always remain aligned parallel to one another on account of the rigid mechanical coupling of the guiding slides 120 and 124 and also 122 and 126, and consequently there is double parallel guidance for the slide element 70.

As represented in FIG. 2, the movement of the guiding slides 120 and 124 takes place by means of a first linear drive 190, which could be formed for example as an electric linear motor, but is preferably a spindle drive, and comprises an adjusting spindle 192, on which there is a spindle nut 194, which is for example fixedly connected to the bearing flange 170 of the first guiding slide 120.

The adjusting spindle 192 is for its part mounted in a bearing support 196 fixedly connected to the machine bed body 20 in such a way that it is non-displaceable in the direction of its longitudinal axis 198 but rotatable, so that turning of the adjusting spindle 192 leads to a displacement of the spindle nut 194 in the direction of the longitudinal axis 198.

Furthermore, the adjusting spindle 192 can be driven in a rotating manner about the longitudinal axis 198 by a drive 200.

Consequently, the guiding slides 120 and 124 can be moved together in the guiding direction 130 by the linear drive 190.

In the same way, a second linear drive 210 is provided for moving the guiding slides 122 and 126, which drive comprises an adjusting spindle 212, a spindle nut 214 and a bearing support 216, the adjusting spindle 212 being accommodated in the bearing support 216 in such a way that it is immovable in the direction of its longitudinal axis 218 but rotatable.

Since it is also provided in the case of the second linear drive 210 that the spindle nut 214 is fixedly connected to one of the guiding slides, in this case the guiding slide 126, both the guiding slide 126 and the guiding slide 122 can be displaced in the guiding direction 130 by turning the adjusting spindle 212, for example driven by a drive 220.

Depending on the absolute position of the guiding slides 120 and 124 or 122 and 126, and depending on the relative position of the guiding slides 120 and 124 or 122 and 126, the position of the second slide element 70 can consequently be fixed with the required rigidity both in the Z direction and in the X direction.

The absolute position of the guiding slides 120 and 124 or 122 and 126 can be detected in this case by rotary encoders which are associated with the linear drives 190 and 210 and detect the rotational positions of the adjusting spindles 192 and 212.

Furthermore, as already represented in FIG. 3, the relative position of the guiding slides 120 and 124 or 122 and 126 that are connected to one another can be detected by a measuring system 230, which comprises a first element 232, disposed for example on the connecting strut 150, and a second element 234, disposed on the connecting strut 160, so that the two elements 232 and 234 are displaceable with respect to one another, one of the elements carrying a glass scale, with which the relative position of the guiding slides 120 and 124 and also 122 and 126 that are coupled to one another can be detected, this relative position representing a measure of the position of the second slide element 70 in the X direction of the machine tool.

In order to minimize the effects of thermal displacements on the position of the slide elements $70_1$ and $70_2$, the guiding rails 134 of the drive devices 80 are preferably disposed in such a way that they lie on a side of the points of application 82, 84 that is facing the spindle axis 26, in particular near a reference plane 240 of the machine tool which runs through the spindle axis 26 and perpendicularly in relation to the X direction, that is to say parallel to the Y direction. Consequently, the thermal displacements caused by the drive devices 80 according to the invention are minimal, in particular since the drive struts 90, 92, 94, 96 do not have their own heat-dissipating drives, but instead the heat-dissipating drives, namely the drives 200 and 220, can be disposed at a sufficient distance from the drive device 80, so that heat only enters the drive devices $80_1$ and $80_2$ according to the invention indirectly via the drives 200, 220, and consequently the resultant thermal displacements are likewise minimal.

Furthermore, the guiding rail 134 associated with the respective drive device $80_1$ and $80_2$ is fixedly connected directly to the machine bed body 20 near the reference plane 240, so that thermal displacements of the reference plane 240 itself, for example caused by heating of the machine bed body 20, do not have any effect on the positional accuracy of the respective second slide element $70_1$ or $70_2$, since its position relates substantially to the relative position in relation to the reference plane 240, the absolute position of which is immaterial.

The drives 200, 220 of each of the drive devices $80_1$ and $80_2$ can be controlled by means of a control which is designated as a whole by 250, positions the respective slide element 70 in the X direction by synchronous displacement of the guiding slides 120 and 124 or 122 and 126 that are coupled to one another and converts the desired position of the slide element 70 in the X direction into a relative position between the slide elements 120 and 124 or 122 and 126 that are coupled to one another.

The invention claimed is:

1. Machine tool for machining a workpiece by a relative movement between the workpiece and a tool, comprising a machine frame, a carrier disposed on the machine frame and having a first receiving means for the workpiece or the tool, a slide system disposed on the machine frame, said slide system having a first slide element arranged on said machine frame and a second slide element which carries a second receiving means for the tool or the workpiece, respectively, said second slide element being guided on and movable with respect to said first slide element in a fixed movement zone of a slide movement area in the direction of two slide movement axes running transversely in relation to one another and comprising a drive device for moving the second slide element, which second slide element is movable in relation to the first receiving means, which drive device acts on the second slide element at two spaced-apart points of application by four drive struts extending parallel to two different directions, said four drive struts being of equal length, and with which drive device the two points of application can be positioned by means of the four drive struts, two drive struts with a pivot joint acting on one of the two points of application of the second slide element, each of said drive struts being pivotally connected to a respective guiding slide, which is guided in a linearly movable manner transversely in relation to the longitudinal direction of the respective drive struts, and all guiding slides being guided in guiding directions running parallel to each other.

2. Machine tool according to claim 1, wherein the second slide element is rotationally fixed.

3. Machine tool according to claim 1, wherein the guiding slides are disposed one following the other on a common guideway.

4. Machine tool according to claim 1, wherein the four drive struts form two drive groups, each with non-parallel drive struts, the guiding slides of each drive group are disposed one directly following the other.

5. Machine tool according to claim 4, wherein the two drive group include a first drive group and a second drive group, wherein a mechanically rigid connection between first guiding slides slides of the first drive group and the second drive group runs on a different side of the guideway than a mechanically rigid connection between second guiding slides of the first drive group and the second drive group.

6. Machine tool for machining a workpiece by a relative movement between the workpiece and a tool, comprising a machine frame, a carrier disposed on the machine frame and having a first receiving means for the workpiece or the tool, a compound slide system disposed on the machine frame and having a slide element which carries a second receiving means for the tool or the workpiece, respectively and can be moved by the compound slide system in relation to the first receiving means in a fixed movement zone of a compound slide movement area in the direction of two compound slide movement axes running transversely in relation to one another and comprising a drive device for moving the slide element that is movable in relation to the first receiving means, which drive device acts on the slide element at at least two spaced-apart points of application by four drive struts extending parallel to at least two different directions, and with which drive device the at least two points of application can be positioned by means of the four drive struts, said four drive struts being of invariant length, each with a pivot joint, act on the slide element, each of which drive struts being pivotally connected to a guiding slide, which is guided in a linearly movable manner transversely in relation to the longitudinal direction of the respective drive struts, a maximum of two of which drive struts running parallel to one another, the four drive struts forming two drive groups, each group comprising two non-parallel drive struts, each group further comprising a first of the guiding slides for one of the struts and a second of the guiding slides for the other of the struts, and a measuring system detecting the relative position of the first guiding slide in relation to the second guiding slide.

7. Machine tool according to claim 6, wherein the drive struts of one of the drive groups commonly act on the slide element at one of the points of application.

8. Machine tool according to claim 6, wherein the drive struts of each of the drive groups respectively act on the slide element at one of two of the points of application.

9. Machine tool according to claim 6, wherein the second of the guiding slides of a first of the drive groups and the second of the guiding slides of a second of the drive groups are movable along the same guiding direction.

10. Machine tool according to claim 9, wherein the second guiding slides of the first and second drive groups are guided on a common guideway.

11. Machine tool according to claim 6, wherein the first guiding slides of first and second of the two drive groups are rigidly coupled together.

12. Machine tool according to claim 11, wherein the first guiding slides are rigidly coupled to one another mechanically.

13. Machine tool according to claim 12, wherein a linear drive is associated with the guiding slides respectively mechanically coupled to one another.

14. Machine tool according to claim 13, wherein the linear drive is a spindle drive.

15. Machine tool according to claim 6, wherein the second guiding slides of first and second of the two drive groups are rigidly coupled together.

16. Machine tool according to claim 15, wherein the second guiding slides are rigidly coupled to one another mechanically.

17. Machine tool according to claim 16, wherein the measuring system detects a relative position of the first guiding slides in relation to the second guiding slides of first and second of the two drive groups.

18. Machine tool according to claim 17, wherein the measuring system is disposed on a connecting struts of the first guiding slides and a connecting strut of the second guiding slides.

19. Machine tool according to claim 6, wherein all guideways for the guiding slides are disposed on a same side of the points of application.

20. The machine tool of claim 6, wherein part of the measuring system is movable with the first guiding slides and another part of the measuring system is movable with the second guiding slides.

21. The machine tool of claim 20, wherein one part of the measuring system is a scale and another part of the measuring system is a detector in communication with the scale, thereby measuring displacement between the first guiding slides and the second guiding slides.

22. The machine tool of claim 6, wherein the measuring system detects a distance between the first guiding slides and the second guiding slides.

23. Machine tool for machining a workpiece by a relative movement between the workpiece and a tool, comprising a machine frame, a carrier disposed on the machine frame and having a spindle rotatable about a spindle axis and provided with a first receiving means for the workpiece or the tool, a slide system disposed on the machine frame and having a slide element which carries a second receiving means for the tool or the workpiece, respectively, and can be moved by the slide system in relation to the first receiving means in a fixed movement zone of a compound slide movement area in the direction of a slide movement axes X running transversely to said spindle axis and a slide movement axis Z running parallel to said spindle axis and comprising a drive device for moving the slide element that is movable in relation to the first receiving means, which drive device acts on the slide element at least two spaced-apart points of application by four drive struts extending parallel to at least two different directions, and with which drive device the at least two points of application can be positioned by means of the four drive struts, said four drive struts being of invariant length and acting on the slide element, each of which struts being pivotally connected to a respective guiding slide, which is guided in a linearly movable manner transversely in relation to the longitudinal direction of the drive struts, and all guideways for the guiding slides being disposed closer to a reference plane than the points of application are, the reference plane extending through the spindle axis and perpendicular to the slide movement axis X.

24. Machine tool according to claim 23, wherein the guiding slides are disposed on a common guideway running near the reference plane.

25. Machine tool according to claim 23, wherein the guideways for all the guiding slides are disposed on the side of the points of application facing the reference plane.

* * * * *

UNITED STATES PATENT AND TRADEMARK OFFICE
CERTIFICATE OF CORRECTION

PATENT NO. : 7,578,036 B2 Page 1 of 1
APPLICATION NO. : 11/964143
DATED : August 25, 2009
INVENTOR(S) : Walter Grossmann It is certified that error appears in the above-identified patent and that said Letters Patent is hereby corrected as shown below:

Col. 10 at line 31 of claim 5, the word "slides" appears twice, the second presentation of the word "slides" can be deleted; and Col. 10 a comma has been omitted and needs to be inserted in claim 6 at line 41, between the words "respectively" and "and".

Signed and Sealed this

Thirteenth Day of October, 2009

David J. Kappos
*Director of the United States Patent and Trademark Office*